United States Patent
Zhuang et al.

(10) Patent No.: US 12,131,422 B2
(45) Date of Patent: Oct. 29, 2024

(54) UNCERTAINTY-AWARE FUSION TOWARDS LARGE-SCALE NeRF

(71) Applicant: NEC Laboratories America, Inc., Princeton, NJ (US)

(72) Inventors: Bingbing Zhuang, San Jose, CA (US); Samuel Schulter, New York, NY (US); Yi-Hsuan Tsai, Santa Clara, CA (US); Buyu Liu, Cupertino, CA (US); Nanbo Li, Edinburgh (GB)

(73) Assignee: NEC Corporation, Tokyo (JP)

( * ) Notice: Subject to any disclaimer, the term of this patent is extended or adjusted under 35 U.S.C. 154(b) by 219 days.

(21) Appl. No.: 17/963,471

(22) Filed: Oct. 11, 2022

(65) Prior Publication Data
US 2023/0154104 A1 May 18, 2023

Related U.S. Application Data

(60) Provisional application No. 63/278,529, filed on Nov. 12, 2021.

(51) Int. Cl.
| | |
|---|---|
| *G06T 17/00* | (2006.01) |
| *G06T 15/00* | (2011.01) |
| *G06T 15/20* | (2011.01) |
| *G06V 10/774* | (2022.01) |

(Continued)

(52) U.S. Cl.
CPC .............. *G06T 15/20* (2013.01); *G06T 15/00* (2013.01); *G06T 17/00* (2013.01); *G06V 10/774* (2022.01); *G06V 10/82* (2022.01); *G06V 20/41* (2022.01); *G06T 2200/08* (2013.01); *G06T 2210/56* (2013.01)

(58) Field of Classification Search
CPC ......... G06T 17/00; G06T 17/05; G06T 15/00; G06T 15/005; G06T 15/08; G06T 15/50; G06T 15/506; G06T 2207/20081; G06T 2207/20084
See application file for complete search history.

(56) References Cited

U.S. PATENT DOCUMENTS

2022/0036602 A1* 2/2022 Duckworth ............... G06T 7/90

OTHER PUBLICATIONS

Martin-Brualla, Ricardo, et al. "NeRF in the Wild: Neural Radiance Fields for Unconstrained Photo Collections." arXiv preprint arXiv:2008.02268 (2020). (Year: 2020).*

(Continued)

*Primary Examiner* — Ryan McCulley
(74) *Attorney, Agent, or Firm* — Joseph Kolodka

(57) ABSTRACT

A method for achieving high-fidelity novel view synthesis and 3D reconstruction for large-scale scenes is presented. The method includes obtaining images from a video stream received from a plurality of video image capturing devices, grouping the images into different image clusters representing a large-scale 3D scene, training a neural radiance field (NeRF) and an uncertainty multilayer perceptron (MLP) for each of the image clusters to generate a plurality of NeRFs and a plurality of uncertainty MLPs for the large-scale 3D scene, applying a rendering loss and an entropy loss to the plurality of NeRFs, performing uncertainty-based fusion to the plurality of NeRFs to define a fused NeRF, and jointly fine-tuning the plurality of NeRFs and the plurality of uncertainty MLPs, and during inference, applying the fused NeRF for novel view synthesis of the large-scale 3D scene.

20 Claims, 5 Drawing Sheets

(51) Int. Cl.
    *G06V 10/82*     (2022.01)
    *G06V 20/40*     (2022.01)

(56) References Cited

OTHER PUBLICATIONS

Bird, T., Ballé, J., Singh, S., & Chou, P. A. (Jun. 29, 2021). 3d scene compression through entropy penalized neural representation functions. In 2021 Picture Coding Symposium (PCS) (pp. 1-5). IEEE.
Chabra, R., Lenssen, J. E., Ilg, E., Schmidt, T., Straub, J., Lovegrove, S., & Newcombe, R. (Aug. 23, 2020). Deep local shapes: Learning local sdf priors for detailed 3d reconstruction. In European Conference on Computer Vision (pp. 608-625). Springer, Cham.
Furukawa, Y., Curless, B., Seitz, S. M., & Szeliski, R. (Jun. 13, 2010). Towards internet-scale multi-view stereo. In 2010 IEEE computer society conference on computer vision and pattern recognition (pp. 1434-1441). IEEE.
Isik, B. (May 7, 2021). Neural 3d scene compression via model compression. arXiv preprint arXiv:2105.03120.
Kajiya, J. T., & Von Herzen, B. P. (Jan. 1, 1984). Ray tracing vol. densities. Acm Siggraph computer graphics, 18(3), 165-174.
Mildenhall, B., Srinivasan, P. P., Tancik, M., Barron, J. T., Ramamoorthi, R., & Ng. R. (Dec. 17, 2021). Nerf: Representing scenes as neural radiance fields for view synthesis. Communications of the ACM, 65(1), 99-106.
Rebain, D., Jiang, W., Yazdani, S., Li, K., Yi, K. M., & Tagliasacchi, A. (Jun. 20, 2021). Derf: Decomposed radiance fields. In Proceedings of the IEEE/CVF Conference on Computer Vision and Pattern Recognition (pp. 14153-14161).

\* cited by examiner

UNCERTAINTY-AWARE FUSION TOWARDS LARGE-SCALE NeRF

RELATED APPLICATION INFORMATION

This application claims priority to Provisional Application No. 63/278,529 filed on Nov. 12, 2021, the contents of which are incorporated herein by reference in their entirety.

BACKGROUND

Technical Field

The present invention relates to 3D scene reconstruction and, more particularly, to uncertainty-aware fusion towards large-scale Neural Radiance Field (NeRF).

Description of the Related Art

The neural implicit function has proven to be an effective way to achieve 3D scene representation. Neural radiance field (NeRF) has emerged as a powerful tool to represent the geometry and radiance of the 3D space as a continuous function, which results in an unprecedented level of fidelity in novel view synthesis. At its core, NeRF makes use of a multilayer perceptron (MLP) to encode the color and density of each 3D point viewed from a different direction. Despite its effectiveness, NeRF has so far been restricted to small-scale scenes due to the limited capacity of the MLP. In other words, NeRF has to trade off scale and resolution with a fixed amount of capacity.

SUMMARY

A method for achieving high-fidelity novel view synthesis and 3D reconstruction for large-scale scenes is presented. The method includes obtaining images from a video stream received from a plurality of video image capturing devices, grouping the images into different image clusters representing a large-scale 3D scene, training a neural radiance field (NeRF) and an uncertainty multilayer perceptron (MLP) for each of the image clusters to generate a plurality of NeRFs and a plurality of uncertainty MLPs for the large-scale 3D scene, applying a rendering loss and an entropy loss to the plurality of NeRFs, performing uncertainty-based fusion to the plurality of NeRFs to define the fused NeRF, and jointly fine-tuning the plurality of NeRFs and the plurality of uncertainty MLPs, and during inference, applying the fused NeRF for novel view synthesis of the large-scale 3D scene.

A non-transitory computer-readable storage medium comprising a computer-readable program for achieving high-fidelity novel view synthesis and 3D reconstruction for large-scale scenes is presented. The computer-readable program when executed on a computer causes the computer to perform the steps of obtaining images from a video stream received from a plurality of video image capturing devices, grouping the images into different image clusters representing a large-scale 3D scene, training a neural radiance field (NeRF) and an uncertainty multilayer perceptron (MLP) for each of the image clusters to generate a plurality of NeRFs and a plurality of uncertainty MLPs for the large-scale 3D scene, applying a rendering loss and an entropy loss to the plurality of NeRFs, performing uncertainty-based fusion to the plurality of NeRFs to define a fused NeRF, and jointly fine-tuning the plurality of NeRFs and the plurality of uncertainty MLPs, and during inference, applying the fused NeRF for novel view synthesis of the large-scale 3D scene.

A system for achieving high-fidelity novel view synthesis and 3D reconstruction for large-scale scenes is presented. The system includes a memory and one or more processors in communication with the memory configured to obtain images from a video stream received from a plurality of video image capturing devices, group the images into different image clusters representing a large-scale 3D scene, train a neural radiance field (NeRF) and an uncertainty multilayer perceptron (MLP) for each of the image clusters to generate a plurality of NeRFs and a plurality of uncertainty MLPs for the large-scale 3D scene, apply a rendering loss and an entropy loss to the plurality of NeRFs, perform uncertainty-based fusion to the plurality of NeRFs to define a fused NeRF, and jointly fine-tune the plurality of NeRFs and the plurality of uncertainty MLPs, and during inference, apply the fused NeRF for novel view synthesis of the large-scale 3D scene.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
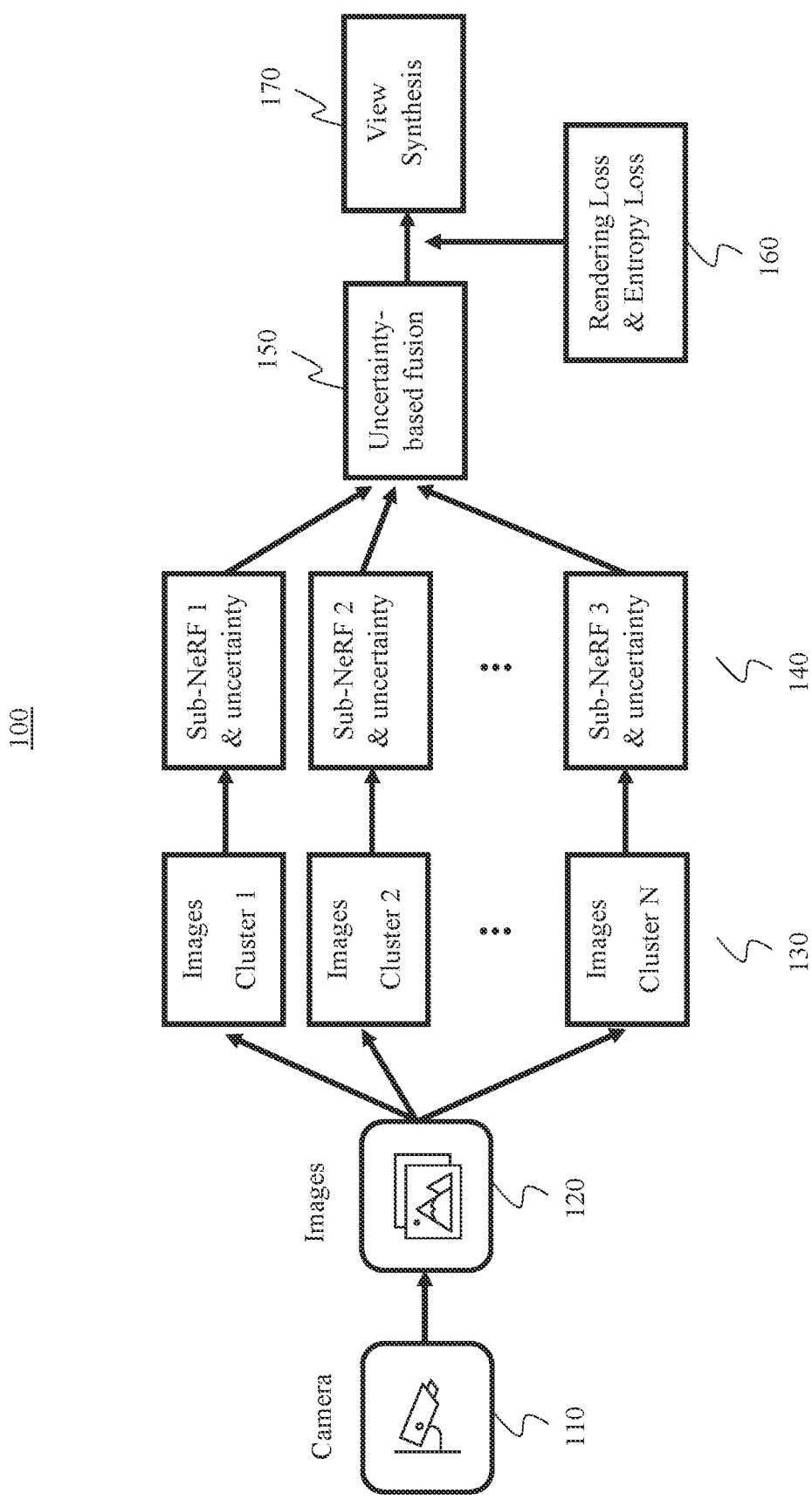
FIG. 1 is a block/flow diagram of an exemplary uncertainty-based fusion of NeRF for large-scale 3D scene representation, in accordance with embodiments of the present invention.

Implicit neural representation of 3D scenes has greatly evolved novel view synthesis, or free view rendering, in recent years. In particular, Neural Radiance Field (NeRF) stands out as a powerful representation. Built upon classical volume rendering, NeRF regresses the volume density and color in a 3D volume using a Multi-layer Perceptron (MLP), achieving unprecedented level of fidelity in rendering complex scenes with view-dependent effects.

Impressive as it is, NeRF represented as a single MLP does have drawbacks. First, NeRF suffers from the inherent scale-resolution trade-off due to the limited capacity of a single MLP, and hence has been restricted to small-scale scenes. Second, representing the whole scene as a single MLP does not lend itself to flexibly assigning different capacity to different portions of the scene according to appearance complexity, or to vary the granularity of representation across the space according to practical need. The exemplary embodiments show that these issues are mitigated if a robust method to fuse multiple NeRFs is available and propose to regress an implicit uncertainty field towards this goal.

The scalability issue has been relatively under-studied in NeRF. What does exist are volume (or space) decomposition strategies. These methods achieve faster training speed by dividing the space in a certain way and represent each constituent region with a separate NeRF. While this strategy has been applied to scale up 3D shape fitting from point clouds, it is not as convenient when it comes to implicit representation learning solely from images, that is, the points in 3D space become tightly coupled as soon as rendering is incurred along camera rays. Instead of space clustering or decomposition, the exemplary embodiments tackle the scalability problem from an alternative perspective, that is, image-clustering-based compositional NeRF. This is inspired by CMVS, a classical large-scale multiview-stereo system that establishes locality via image clustering. Here, it is assumed that images are purposely captured such that images form clusters, each focusing on a part of the space, and overlap exists between different parts. Image-level decomposition has the immediate advantage of allowing separate training of individual NeRFs in parallel. It is observed that this separation leads to full concentration of each NeRF in the region covered by the image cluster, thus yielding higher fidelity individually.

Such image-clustering-based compositional NeRF also offers a convenient means to vary representation capacity or granularity across space at will. Separate NeRFs could be trained for each image cluster targeted at different levels of resolution.

Despite the advantage in quality and flexibility, the separate training also necessitates an additional step to merge all individual NeRFs to enable free view rendering even across the territory of different NeRFs, as if it were a single NeRF. To this end, the exemplary embodiments regress an uncertainty field as a 6D continuous function using an MLP. The uncertainty network takes as input a 6D coordinate including spatial location, viewing direction and distance, while outputting the uncertainty for each of the individual NeRFs. The uncertainty quantification so obtained is then adopted for the fusion of NeRFs. In addition, the exemplary embodiments introduce an effective strategy for NeRF stitching even without accessing its training images. It is also worth mentioning that the exemplary method opens doors to the application of fusing and hence augmenting crowdsourced NeRFs.

The contributions include at least enhancing NeRF's scalability and flexibility in granularity by image-clustering-based compositional NeRF. The exemplary embodiments present a NeRF fusion scheme by regressing a 6D uncertainty field using an MLP and demonstrate state-of-the-art quality of free view rendering in real-world room-level indoor scenes.

NeRF represents the scene as an implicit neural radiance field including the volume density $\sigma$ and directional emitted radiance c. The radiance field realized by an MLP may be optimized via volume rendering followed by an image reconstruction loss. Specifically, given a pixel shot from the camera center o along the viewing direction d, the volume rendered color C reads:

$$C(o,d)=\int_{t_n}^{t_f} T(t)\sigma(r(t))c(r(t),d)dt \quad (1)$$

where $r(t)=o+td$, tracing points along the ray with varying distance t bounded by $[t_n, t_f]$, and $T(t)=\exp(-\int_{t_n}^{t}\sigma(r(s))ds)$.

Regarding image-clustering-based compositional NeRF, the exemplary embodiments study the problem setting where the images are purposely captured in such a way that, it includes a number of image clusters each focusing on a region of the scene, with overlapping between each other. In particular, the following two configurations are described.

Local-Local NeRF, being a simple scenario where all individual NeRFs are on equal footing. Each image cluster evenly focuses on a subspace of the scene, with the same desired resolution.

Global-Local NeRF, where it might not be desired to reconstruct the entire scene with the same level of granularity, but rather having varying preference. For example, in an indoor environment, it may be desired the NeRF capture only the global structure of the whole room, but meanwhile have the zoom-in capability to inspect finer details in regions of interest. The exemplary embodiments leverage separate global and local NeRFs to capture scenes at different granularity.

The framework is motivated by an important observation, that is, for pixels well covered by the individual image cluster, the corresponding individual NeRF is of higher fidelity than a single NeRF trained with all the images. This is reasonable due to the greater concentration of the former. However, artifacts quickly appear as soon as camera viewpoints are transited across the territory of different individual NeRFs, an inevitable scenario in free view rendering. Therefore, how to best stitch individual NeRFs seamlessly for free view rendering remains a vital question. The exemplary framework is also closely related to recent space-clustering-based composition NeRFs, e.g., Decomposed Radiance Fields (DeRF).

Regarding learning NeRF stitching, the first heuristic way to stitch different NeRFs is by a one-hot selection just based on visibility, that is, for each point along the ray being rendered, a person could choose to query only the NeRF with the maximum number of training images seeing that point. In addition, it is argued that the NeRF selection in such a pipeline should also consider the viewing direction and distance. Intuitively, visibility counting should downweigh images that observe the points far from the viewpoint being rendered, and vice versa. It is further observed that this approach works to some degree but is far from satisfactory, primarily due to lack of principled learning and optimization.

Regarding the implicit uncertainty field, the exemplary methods propose learning NeRF stitching by regressing an implicit uncertainty field as a 6D continuous function. This uncertainty network, implemented as an MLP, takes as input the spatial location (x, y, z) of a point, the viewing direction d and distance t, and outputs $w \in \mathbb{R}^N$, each element $w_i$ corresponding to the prediction confidence of NeRF i. During training, given a randomly sampled pixel (c, d) from posed training images, the points r(t) along the backpropagated ray together with the viewing direction d are passed to each individual NeRF, querying volume density and color. In addition, the aforementioned 6D coordinate associated with the point is applied to query the uncertainty MLP.

Individual NeRFs are then stitched and volume rendered as follows:

$$\hat{C}(o,d) = \int_{t_n}^{t_f} T(t)\hat{\sigma}(r(t))\hat{c}(r(t),d)dt \quad (2)$$

-continued $$\{\hat{\sigma}(r(t)), \hat{c}(r(t), d)\} = \frac{\sum_k^N w_i \{\sigma_i(t), c(r(t), d)\}}{\sum_k^N w_i} \quad (3)$$

The network is trained by the image reconstruction loss:

$$L = \|\hat{C}(o,d) - C_{GT}\|^2 \quad (4)$$

It is noted that individual NeRFs are trained beforehand for each image cluster in parallel, and only the uncertainty MLP is optimized. Positional encoding and quadrature are further applied.

Regarding the implicit uncertainty field without images, the exemplary methods also learn the uncertainty field even without accessing the training images of individual NeRFs, for two reasons. First, this sheds light on understanding the behavior underlying the preceding framework with images, as detailed shortly. Second, in view of the lightweight of NeRF yielding good potential for scene compression purposes, chances are that images may no longer be kept around after training if storage is of concern. A simple, yet effective view voting strategy is employed that uses only camera poses of training images. In each training iteration, the exemplary embodiments randomly select an image and a pixel therein, and feed into the uncertainty MLP the 6D coordinate is associated with and the point along the ray.

Suppose the selected image belongs to image cluster k, the network output is then directly supervised with the following loss:

$$L = \|w - w_{vote}\|_1 \quad (5)$$

where $w_{vote}$ is a one-hot vector with $w_k = 1$. In essence, each iteration casts a vote from an image cluster for the spatial point viewed at a particular direction and distance. As training proceeds, the uncertainty network must balance the competition among different sources of force and find a smooth function that best explains the viewpoint distribution.

With respect to the relation to space-clustering-based approach DeRF, it is argued that the proposed image-clustering-based decomposition has several advantages, and it also lends itself well to distributed computing. It is true that the sequential nature of the exemplary method makes it suboptimal in principle compared to joint training with all the images. However, it is empirically observed that the advantages brought about by the high-fidelity of individual NeRFs outweighs potential defects resulting from the sequential procedure and the imperfection in stitching.

Despite the discrepancy, it is worth stating that the goal is not to dispense with the space-clustering-based methods such as DeRF. Rather, DeRF's strength is in fact compatible with the exemplary method in that it could be applied inside each individual NeRFs as well.

FIG. 1 is a block/flow diagram of an exemplary uncertainty-based fusion of NeRF for large-scale 3D scene representation, in accordance with embodiments of the present invention.

FIG. 1 illustrates the pipeline 100 (or image-clustering-based compositional NeRF scheme 100) of the proposed uncertainty-based fusion of NeRF for large-scale 3D scene representation. The camera 110 captures a set of images 120 fully covering the scene, e.g., an apartment. The images 120 are grouped into different clusters 130, each focusing on a small portion of the scene. For each image cluster 130, the exemplary methods train individual NeRFs, in parallel, as in a standard NeRF framework. Next, with the trained individual NeRFs fixed, the uncertainty MLP 140 for all NeRFs are trained together, by fusing NeRFs based on uncertainty 150.

Figure 2:
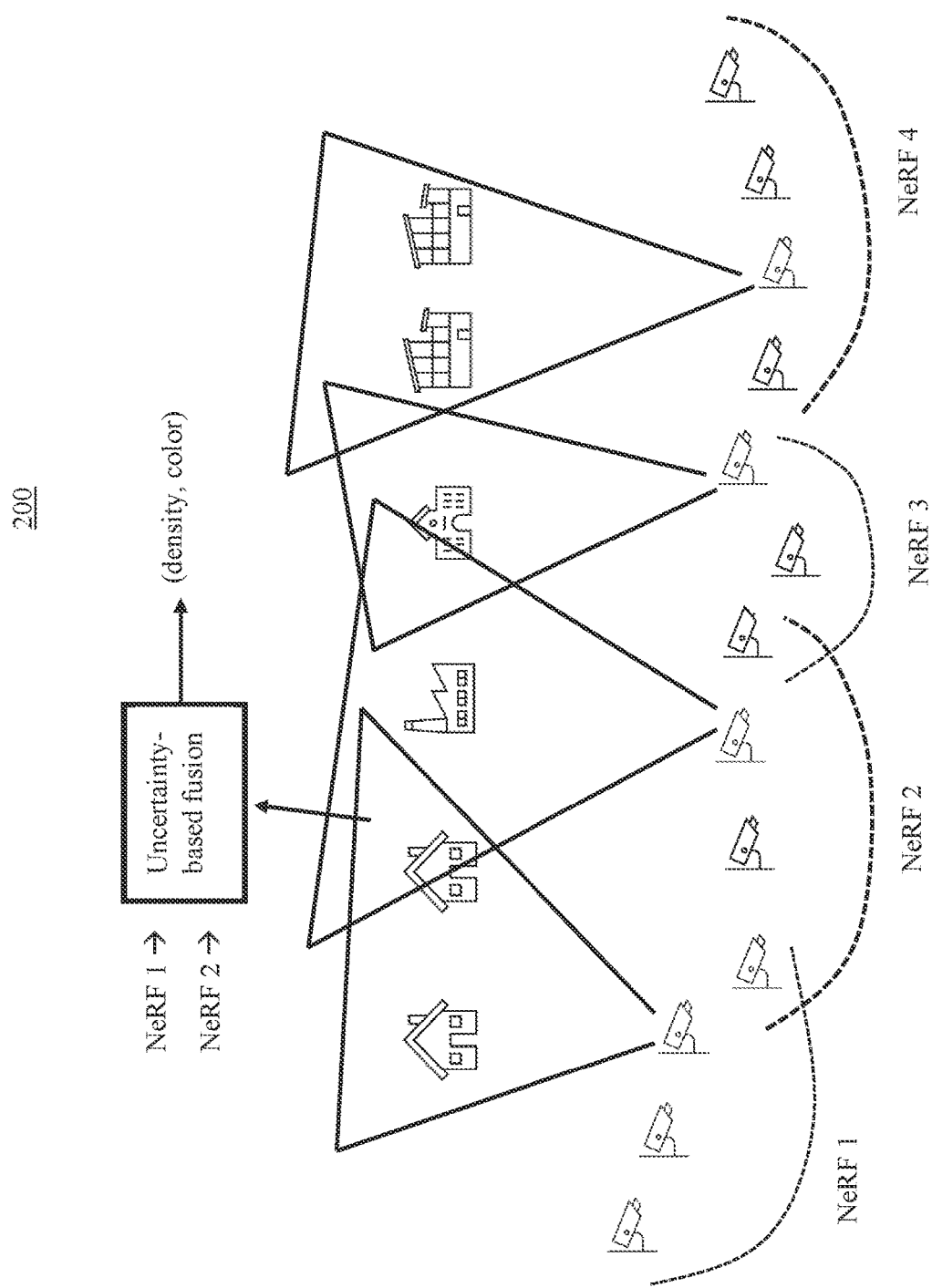
FIG. 2 is block/flow diagram of an exemplary large-scale 3D scene representation, in accordance with embodiments of the present invention.

FIG. 2 is block/flow diagram of an exemplary large-scale 3D scene representation, in accordance with embodiments of the present invention.

For the large-scale scene 200 that is beyond what a single NeRF can model, the exemplary embodiments cluster the image collections into four groups, and the exemplary embodiments train an individual NeRF for each cluster with uncertainty. For an example 3D point, the exemplary embodiments fuse NeRF 1 and NeRF 2 based on their respective uncertainty at this point to obtain the fused density and color prediction. The exemplary embodiments train each individual NeRF separately, in parallel, followed by training their uncertainty prediction networks. During training, the exemplary embodiments synthesize views 170, and then apply a rendering loss and an entropy loss 160 to optimize the uncertainty network. The exemplary embodiments train each sub-NeRF and then jointly train all uncertainty networks. During inference, the trained NeRFs and uncertainty are applied to render novel views 170.

Regarding FIGS. 1 and 2, the exemplary embodiments aim to develop NeRFs that achieve high-fidelity novel view synthesis and 3D reconstruction in unprecedentedly large-scale scenes. To this end, new techniques are proposed including, a divide-and-conquer strategy to cluster images into smaller separate groups and learn a NeRF for each group individually, uncertainty quantification of NeRF and uncertainty-aware fusion of individual NeRFs to obtain compositional NeRFs that work for the whole scene, and a new entropy loss that leads to more accurate 3D geometry in NeRF.

First, due to the limited capacity of MLPs, the exemplary embodiments train multiple MLPs with each focusing on a relatively small portion of the scene, and thus each MLP can achieve high-quality encoding of the scene geometry and radiance. An advantage of this strategy lies in that it readily allows parallel training of multiple MLPs using distributed computing sources, thereby handling large-scale scenes in an efficient way. Next, the exemplary embodiments need to combine all individual NeRFs to encode the whole scene in a holistic manner for large-scale novel view synthesis and 3D reconstruction. To this end, the exemplary embodiments fuse the individual NeRFs and handle the stitching in overlapping regions in a principled probabilistic fashion.

In particular, the geometric uncertainty of density prediction is derived for each NeRF in each 3D point based on Jacobian of the rendering loss function and the approximate Gaussian distribution for each density prediction is obtained. This distribution is leveraged to fuse different NeRFs following Bayes' rule. Since the geometric uncertainty is computationally expensive to calculate, a light-weight MLP is trained to predict uncertainty. During inference for novel view synthesis, all NeRFs to which the 3D point is visible are queried and are fused based on uncertainty. Finally, since the original NeRF only optimizes for rendering loss without any regularizations on the 3D geometry, it often produces low-quality 3D reconstruction. To address this issue, the exemplary embodiments introduce an entropy loss to enforce the density to be either zero or very large, to sharply distinguish empty and non-empty spaces. It is observed that this leads to significantly improved geometry estimation in NeRF.

Figure 3:
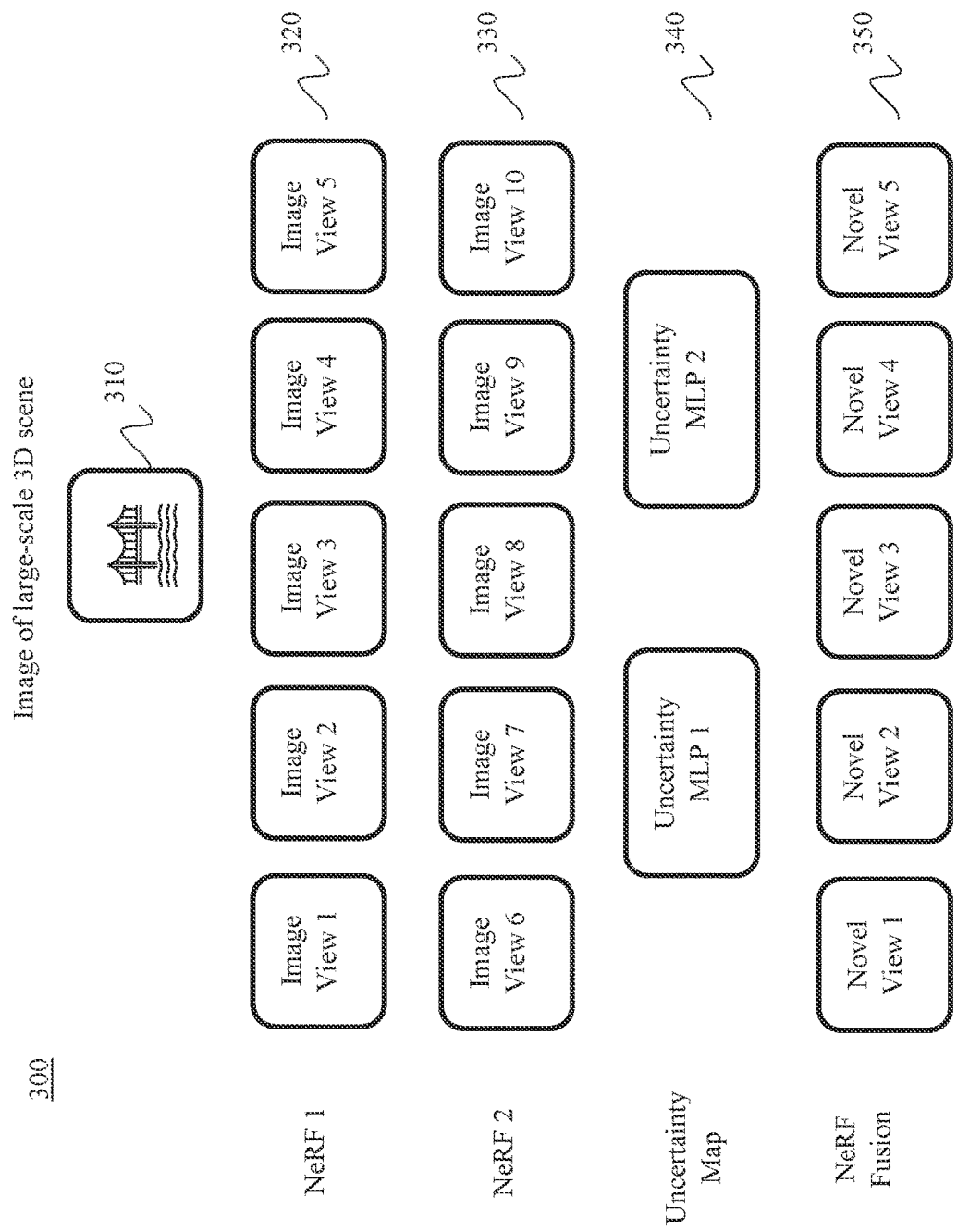
FIG. 3 is a block/flow diagram of a practical application for achieving high-fidelity novel view synthesis and 3D reconstruction for large-scale scenes, in accordance with embodiments of the present invention.

FIG. 3 is a block/flow diagram of a practical application 300 for achieving high-fidelity novel view synthesis and 3D reconstruction for large-scale scenes, in accordance with embodiments of the present invention.

The large-scale 3D scene 310 needs to be reconstructed. NeRF 1 is applied to a small section of the large-scale 3D scene 310 to extract image views 320. Similarly, NeRF 2 is applied to another small section of the large-scale 3D scene 310 to extract image views 330. NeRF 3, NeRF 4, NeRF 5, etc. can also be applied to other sections of the large-scale 3D scene 310 until all portions or sections or areas of the large-scale 3D scene 310 have been covered. An uncertainty MLP 340 is trained for each NeRF. All NeRFs are then fused based-on uncertainty and the fused NeRFs are applied for novel view synthesis 350.

Therefore, according to FIGS. 1-3, a divide-and-conquer strategy is employed to cluster images into smaller separate groups and learn a NeRF for each group individually, uncertainty quantification of NeRF and uncertainty-aware fusion of individual NeRFs is employed to obtain compositional NeRFs that work for the whole scene, and a new entropy loss that leads to more accurate 3D geometry in NeRF is utilized. The divided-and-conquer strategy allows each NeRF with limited capacity to encode only a small portion of the scene, thereby retaining the high fidelity of the scene representation. Afterwards, it is also important to fuse all the NeRFs such that novel views can be rendered as if they are from a single NeRF. An uncertainty-based fusion is utilized as a principled way for this purpose. The exemplary methods derive the Jacobian-based geometric uncertainty and apply an additional uncertainty MLP to regress such values to considerably reduce computational cost. Finally, the exemplary methods also improve the geometry learning in NeRF by proposing a novel entropy loss.

In conclusion, NeRF achieves an unprecedented level of fidelity in novel view synthesis but is restricted to small-scale scenes, since the limited capacity of a single MLP leads to trade-offs between resolution and scale. To mitigate this issue, the exemplary embodiments propose to leverage locality with a new image-clustering-based compositional NeRF scheme. This scheme groups images into clusters, each focusing on a subset of the scene, and learns individual NeRFs for each cluster. It is shown that such image-level scene decomposition is distinct from, and has advantages over, the common volume decomposition strategy. To render the whole scene, a NeRF stitching framework is put forth to merge all NeRFs. Specifically, the exemplary embodiments regress an implicit uncertainty field as a 6D continuous function using an MLP. For a 3D point, the uncertainty network takes as input its spatial location, viewing direct and distance, while outputting for each individual NeRF its uncertainty quantification, which is further leveraged to fuse volume density and color queried from individual NeRFs. Besides scaling up NeRF, the exemplary framework also enables flexible composition of NeRFs at different granularity. NeRF-stitching demonstrates state-of-the-art rendering quality in room-level indoor scenes.

Figure 4:
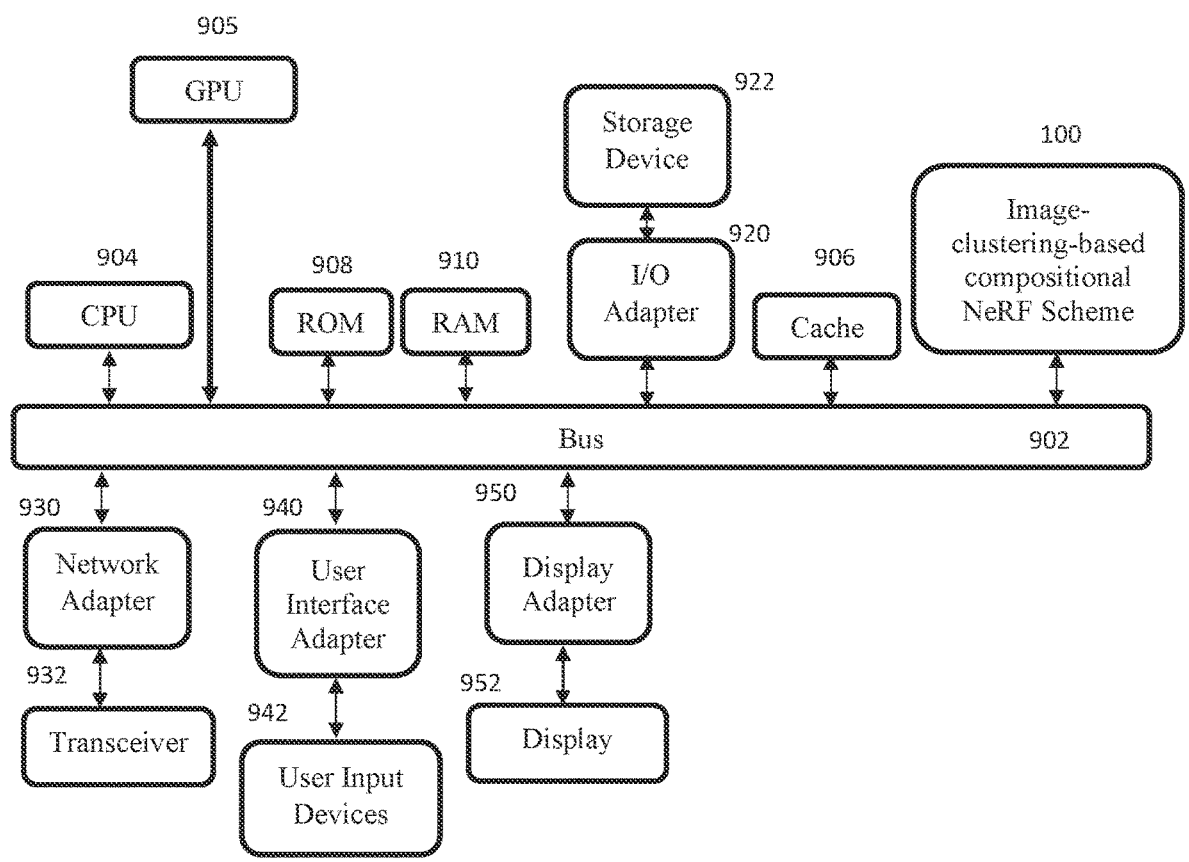
FIG. 4 is an exemplary processing system for achieving high-fidelity novel view synthesis and 3D reconstruction for large-scale scenes, in accordance with embodiments of the present invention.

FIG. 4 is an exemplary processing system for achieving high-fidelity novel view synthesis and 3D reconstruction for large-scale scenes, in accordance with embodiments of the present invention.

The processing system includes at least one processor (CPU) 904 operatively coupled to other components via a system bus 902. A Graphical Processing Unit (GPU) 905, a cache 906, a Read Only Memory (ROM) 908, a Random Access Memory (RAM) 910, an Input/Output (I/O) adapter 920, a network adapter 930, a user interface adapter 940, and a display adapter 950, are operatively coupled to the system bus 902. Additionally, an image-clustering-based compositional NeRF scheme 100 is electrically connected to the bus 902.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 5:
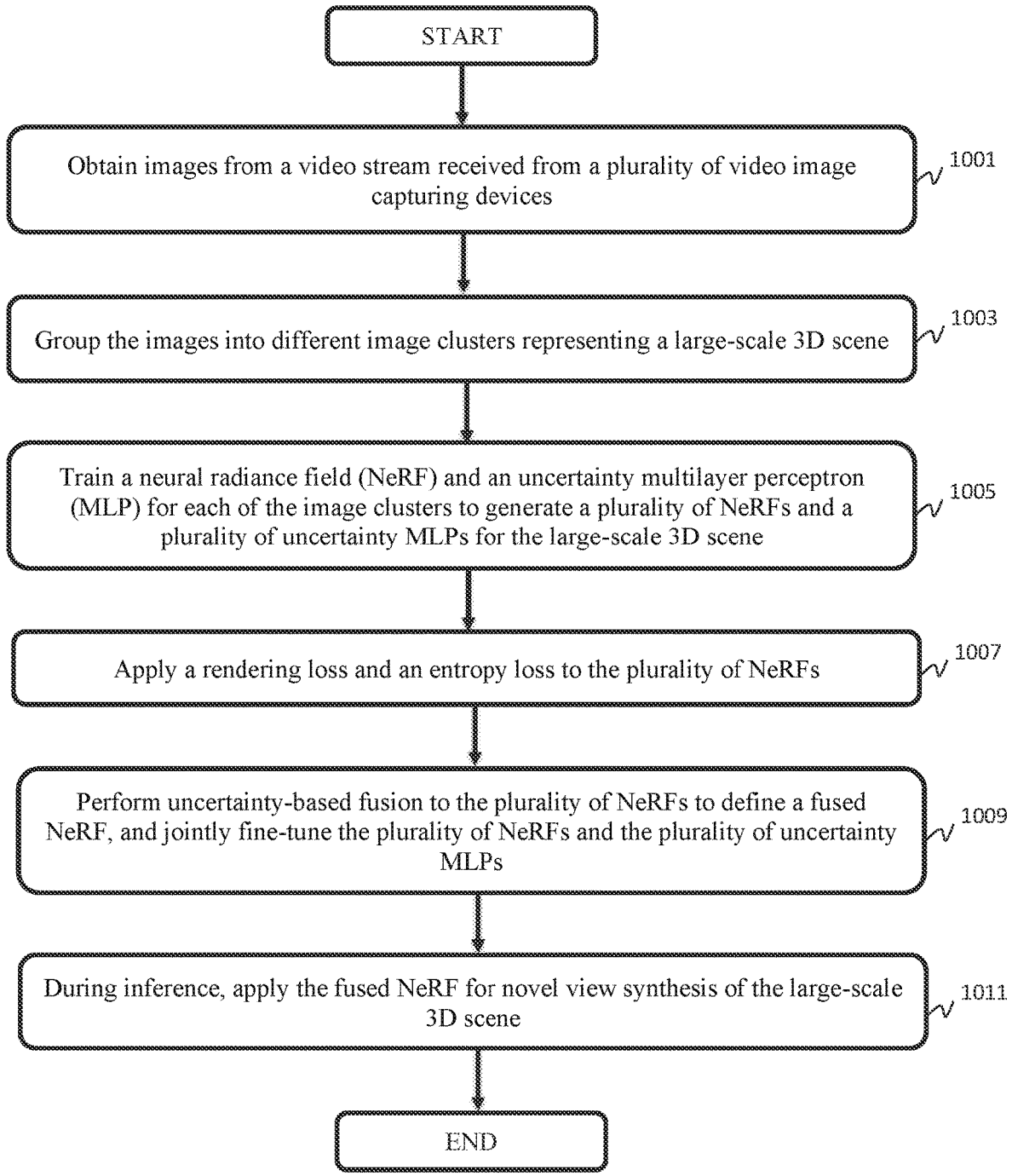
FIG. 5 is a block/flow diagram of an exemplary method for achieving high-fidelity novel view synthesis and 3D reconstruction for large-scale scenes, in accordance with embodiments of the present invention.

FIG. 5 is a block/flow diagram of an exemplary method for achieving high-fidelity novel view synthesis and 3D reconstruction for large-scale scenes, in accordance with embodiments of the present invention.

At block 1001, obtain images from a video stream received from a plurality of video image capturing devices.

At block 1003, group the images into different image clusters representing a large-scale 3D scene.

At block 1005, train a neural radiance field (NeRF) and an uncertainty multilayer perceptron (MLP) for each of the image clusters to generate a plurality of NeRFs and a plurality of uncertainty MLPs for the large-scale 3D scene.

At block 1007, apply a rendering loss and an entropy loss to the plurality of NeRFs.

At block 1009, perform uncertainty-based fusion to the plurality of NeRFs to define a fused NeRF, and jointly fine-tune the plurality of NeRFs and the plurality of uncertainty MLPs.

At block 1011, during inference, apply the fused NeRF for novel view synthesis of the large-scale 3D scene.

Consequently, in accordance with the exemplary embodiments, data acquisition takes place to select a scene, e.g., an apartment or building, for scene representation learning, and then images of the scene are captured. The images cover all parts of the scene that are desired to perform novel view synthesis. Then structure-from-motion algorithms are run to obtain the camera poses of each image. The images are grouped into different clusters according to their viewpoints and the NeRF and uncertainty MLP for each individual image cluster are trained using the rendering loss and the entropy loss. Uncertainty-based fusion of NeRFs is performed and all the NeRFs and uncertainty MLPs are jointly fine-tuned. Finally, during inference, the fused NeRF are leveraged for novel view synthesis of the large-scale scene.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from another computing device or can be received indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an Erasable Programmable Read-Only Memory (EPROM or Flash memory), an optical fiber, a portable CD-ROM, an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for achieving high-fidelity novel view synthesis and 3D reconstruction for large-scale scenes, the method comprising:
   obtaining images from a video stream received from a plurality of video image capturing devices;
   grouping the images into different image clusters representing a large-scale 3D scene;
   training a neural radiance field (NeRF) and an uncertainty multilayer perceptron (MLP) for each of the image clusters to generate a plurality of NeRFs and a plurality of uncertainty MLPs for the large-scale 3D scene;
   applying a rendering loss and an entropy loss to the plurality of NeRFs;
   performing uncertainty-based fusion to the plurality of NeRFs to define a fused NeRF, and jointly fine-tuning the plurality of NeRFs and the plurality of uncertainty MLPs; and
   during inference, applying the fused NeRF for novel view synthesis of the large-scale 3D scene.

2. The method of claim 1, wherein the plurality of uncertainty MLPs are trained jointly and the plurality of NeRFs are trained in parallel.

3. The method of claim 1, wherein a geometric uncertainty of density prediction for each of the plurality of NeRFs in each 3D point is derived based on Jacobian of the rendering loss and an approximate Gaussian distribution for each density prediction is obtained.

4. The method of claim 1, wherein NeRF stitching is learned by regressing an implicit uncertainty field of an uncertainty network as a 6D continuous function.

5. The method of claim 4, wherein, for a 3D point in the large-scale 3D scene, the uncertainty network takes as input a spatial location of the 3D point, and a viewing direction and distance, while outputting for each NeRF of the plurality of NeRFs an uncertainty quantification.

6. The method of claim 5, wherein a 6D coordinate associated with the 3D point is applied to query an uncertainty MLP of the plurality of uncertainty MLPs.

7. The method of claim 1, wherein an uncertainty field is learned without accessing training images of each of the plurality of NeRFs by employing a voting strategy that uses only camera poses of trained images.

8. A non-transitory computer-readable storage medium comprising a computer-readable program for achieving high-fidelity novel view synthesis and 3D reconstruction for large-scale scenes, wherein the computer-readable program when executed on a computer causes the computer to perform the steps of:
   obtaining images from a video stream received from a plurality of video image capturing devices;
   grouping the images into different image clusters representing a large-scale 3D scene;
   training a neural radiance field (NeRF) and an uncertainty multilayer perceptron (MLP) for each of the image clusters to generate a plurality of NeRFs and a plurality of uncertainty MLPs for the large-scale 3D scene;
   applying a rendering loss and an entropy loss to the plurality of NeRFs;
   performing uncertainty-based fusion to the plurality of NeRFs to define a fused NeRF, and jointly fine-tuning the plurality of NeRFs and the plurality of uncertainty MLPs; and
   during inference, applying the fused NeRF for novel view synthesis of the large-scale 3D scene.

9. The non-transitory computer-readable storage medium of claim 8, wherein the plurality of uncertainty MLPs are trained jointly and the plurality of NeRFs are trained in parallel.

10. The non-transitory computer-readable storage medium of claim 8, wherein a geometric uncertainty of density prediction for each of the plurality of NeRFs in each 3D point is derived based on Jacobian of the rendering loss and an approximate Gaussian distribution for each density prediction is obtained.

11. The non-transitory computer-readable storage medium of claim 8, wherein NeRF stitching is learned by regressing an implicit uncertainty field of an uncertainty network as a 6D continuous function.

12. The non-transitory computer-readable storage medium of claim 11, wherein, for a 3D point in the large-scale 3D scene, the uncertainty network takes as input a spatial location of the 3D point, and a viewing direction and distance, while outputting for each NeRF of the plurality of NeRFs an uncertainty quantification.

13. The non-transitory computer-readable storage medium of claim 12, wherein a 6D coordinate associated with the 3D point is applied to query an uncertainty MLP of the plurality of uncertainty MLPs.

14. The non-transitory computer-readable storage medium of claim 8, wherein an uncertainty field is learned without accessing training images of each of the plurality of NeRFs by employing a voting strategy that uses only camera poses of trained images.

15. A system for achieving high-fidelity novel view synthesis and 3D reconstruction for large-scale scenes, the system comprising:
   a memory; and
   one or more processors in communication with the memory configured to:
      obtain images from a video stream received from a plurality of video image capturing devices;
      group the images into different image clusters representing a large-scale 3D scene;
      train a neural radiance field (NeRF) and an uncertainty multilayer perceptron (MLP) for each of the image clusters to generate a plurality of NeRFs and a plurality of uncertainty MLPs for the large-scale 3D scene;
      apply a rendering loss and an entropy loss to the plurality of NeRFs;
      perform uncertainty-based fusion to the plurality of NeRFs to define a fused NeRF, and jointly fine-tune the plurality of NeRFs and the plurality of uncertainty MLPs; and
      during inference, apply the fused NeRF for novel view synthesis of the large-scale 3D scene.

16. The system of claim 15, wherein the plurality of uncertainty MLPs are trained jointly and the plurality of NeRFs are trained in parallel.

17. The system of claim 15, wherein a geometric uncertainty of density prediction for each of the plurality of NeRFs in each 3D point is derived based on Jacobian of the rendering loss and an approximate Gaussian distribution for each density prediction is obtained.

18. The system of claim 15, wherein NeRF stitching is learned by regressing an implicit uncertainty field of an uncertainty network as a 6D continuous function.

19. The system of claim 18, wherein, for a 3D point in the large-scale 3D scene, the uncertainty network takes as input a spatial location of the 3D point, and a viewing direction and distance, while outputting for each NeRF of the plurality of NeRFs an uncertainty quantification.

20. The system of claim 19, wherein a 6D coordinate associated with the 3D point is applied to query an uncertainty MLP of the plurality of uncertainty MLPs.

\* \* \* \* \*